Patented Dec. 9, 1947

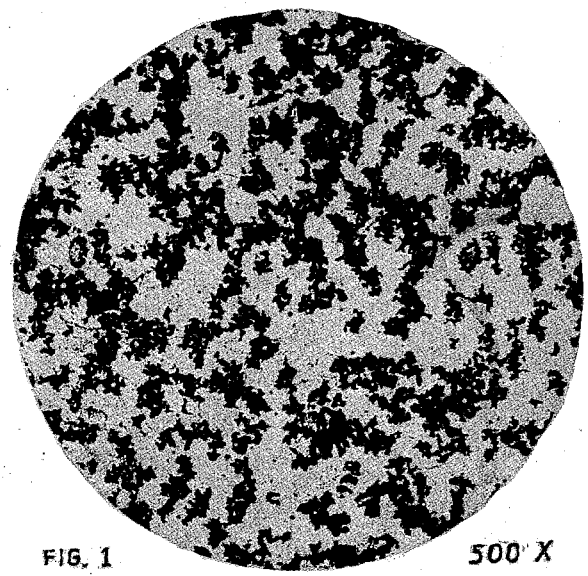
FIG. 1     500 X
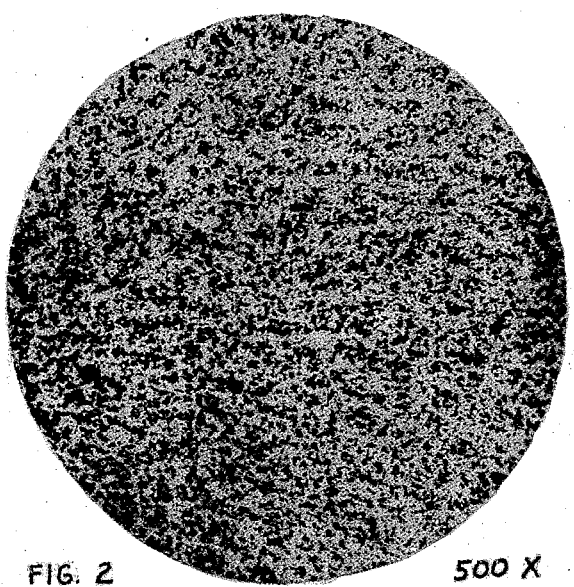
FIG. 2     500 X

2,432,461

UNITED STATES PATENT OFFICE 2,432,461

PIGMENT PREPARATIONS

Vincent C. Vesce, Ridgewood, N. J., assignor to Harmon Color Works, Inc., Paterson, N. J., a corporation of Ohio Application May 8, 1944, Serial No. 534,651

19 Claims. (Cl. 260—763)

This invention relates to the preparation of new surface active suspending agents and the modification of the surface characteristics of pigments, particularly carbon black, to enable the pigments to be wet more readily both by water or organic liquids such as oils, thereby permitting incorporation of the pigments under the most favorable conditions into aqueous systems, such as rubber latex or into substantially non-aqueous systems such as lacquers, paints and enamels.

I have observed that it is highly desirable in the case of aqueous phase systems, for instance a rubber latex, to incorporate the carbon black into the latex from a carbon black aqueous suspension in which the carbon particles are uniformly, finely subdivided, and distributed substantially uniformly throughout the liquid. However, it has been impossible hitherto to prepare directly the requisite aqueous suspension from the commercially available carbon black powders or pellets which contain numerous aggregates composed of strongly adherent carbon black particles. Even ball milling of commercial carbon blacks with water for a long time fails to yield the desired type of suspension of finely subdivided and uniformly distributed particles inasmuch as the aggregates composed of strongly adherent carbon black particles fail to be penetrated or disintegrated by the water. The ball milling of carbon black with water does reduce to a certain extent the larger carbon black aggregates to a uniform state of aggregation but perhaps due to the nature or surfaces of these aggregates the water fails to penetrate to the extent that disintegration or wetting occurs and the requisite subdivision of all the aggregates into finely subdivided particles is not attained. Apparently the aggregates that remain after ball milling the carbon black with water are of a hard dense opaque nature, possibly due to strong capillary adhesive forces between the particles. Neither has it been possible to obtain the requisite aqueous suspension of uniformly finely subdivided carbon black particles directly through the utilization of soaps, alkalis, acids, wetting agents and those agents designed to lower surface tension.

In my patent application, Serial No. 521,744, filed February 8, 1944, I have described among other things, a method of preparing the desired type of an aqueous suspension of carbon black which is substantially free from aggregates. That method comprised forming a concentrated aqueous dispersion of carbon black, subsequently diluting and precipitating same with a flocculating agent, such as an aluminum salt or other polyvalent salt. The resultant suspension of uniformly finely subdivided carbon black was then neutralized and ready for incorporation into synthetic rubber latex prior to coagulation thereof to produce a black rubber crumb. By virtue of the fact that the carbon black is first colloidally dispersed and then precipitated by the use of a flocculating agent, there is produced a suspension of uniformly distributed and uniformly, finely subdivided particles. This flocculated suspension consists of individual particles and groups of individual particles apparently each separated by an intervening layer of liquid and loosely united by the existing adhesion forces and characterized by the fact that under a microscope there is virtually cessation of Brownian motion. In this suspension any flocculates of these loosely united particles readily disintegrate into finely subdivided individual particles, especially upon being stirred.

Another possible approach to the problem of incorporating carbon black into an aqueous system under the most favorable conditions is to utilize carbon black colloidal dispersions secured by the use of dispersing agents. This method of approach, however, has the operating disadvantages that the stability of any colloidal system is generally uncertain and that a concentrated carbon black colloidal dispersion has a tendency to thicken into a thixotropic paste, while a dilution of this concentrated colloidal dispersion settles badly to form a hard packed sediment.

One object of the invention is to furnish a new type of surface active agent.

Another object is to furnish a surface active agent which with water and agitation penetrates and disintegrates aggregates or agglomerates of pigments, such as carbon black to finely subdivided particles.

Another object is to modify the surface characteristics of pigments to enable their incorporation into either aqueous or non-aqueous systems under the most favorable conditions.

Another object of the invention is to produce a dry pigment which will quickly wet with water and disintegrate readily under agitation to produce in one step a suspension of uniformly finely subdivided and uniformly distributed particles.

Another object of the present invention is to produce a dry carbon black product which will quickly wet and readily disintegrate in water to yield a carbon black suspension which resembles and is similar in properties to a freshly flocculated colloidal dispersion of carbon black.

A specific object is to produce carbon black in a compact form such as a non-dusting bead or pellet yet capable of being quickly and readily disintegrated when agitated with water.

A more specific object is to produce an aqueous suspension prepared directly in one step from a carbon black pellet, which suspension upon incorporation into a rubber latex yields upon coagulation a reinforced pigmented rubber product having improved physical characteristics, such as tensile strength and requiring less milling to disperse homogeneously the carbon black into the rubber than the same type of rubber products made by milling the same type of carbon black in dry form into the rubber.

I have found that new surface active agents result when a dispersing agent is brought into contact with a sufficient amount of a flocculating agent to destroy the colloidal dispersing power of the dispersing agent.

I have further found that an aqueous solution or suspension of such surface active agents has the unexpected property when agitated or milled with a dry pigment, such as carbon black, of quickly penetrating and speedily disintegrating the existing aggregates to form directly in one step a suspension of uniformly finely subdivided particles substantially free from aggregates and agglomerates of the kind incapable of being separated into individual particles upon stirring. Additionally I have found that a composition comprised of a pigment and surface active agent of the invention wet readily both in aqueous and non-aqueous systems, such as oils. Such compositions, furthermore, can be shaped by conventional methods into pellets without losing their desirable disintegrating properties.

When a certain quantity of a dispersing agent is added to a heavy magma of pigment and water a liquefaction occurs, viscosity is greatly reduced and a free flowing liquid ensues. There is a point, however, where an excess of dispersing agent affects adversely the fluidity characteristics of the mixture. For instance, one may titrate a given quantity of pigment with solutions of dispersing agents of different concentrations and by finding the volume required for each solution to produce fluidity a curve passing through a minimum range may be plotted which curve is quite characteristic for a given dispersing agent and pigment. The optimum point, that is, the least amount of dispersing agent required to produce a good concentrated dispersion will be found to yield a true colloidally dispersed system in which the particles repel one another because of a like ionic charge existing upon each individual particle. On the other hand, when the titration is carried out with plain water the fluidity points when plotted form a straight line and larger volumes are required to reach a flowing point. Moreover, water titration yields a suspension rather than a colloidal dispersion.

When carbon black is titrated with solutions at different concentrations of the new surface active agents compounded from a dispersing agent and a flocculating agent substantially a straight line similar to water is obtained. Surprisingly, however, the surface active suspending agents of the invention additionally exhibit a penetrating and disintegrating effect on pigment aggregates in the presence of water coupled with agitation. But, unlike true dispersing agents, no colloidal dispersing action is evidenced. That is to say, a true dispersing agent gives practically a dispersed "solution" which exhibits strong Brownian motion when examined under the microscope, while the suspensions produced by the new surface active agents show a completely finely subdivided uniformly flocculated condition, a virtual cessation of Brownian motion and yield upon filtration a water white filtrate.

*Example 1*

(a) 400 grams of quebracho extract powder was dissolved in 200 cc. water at room temperature. Then 80 grams of caustic soda flakes were added thereto and stirred until thoroughly dissolved. A change in color was noticed which became more pronounced upon heating or upon allowing the solution to stand. The pH was between 10.2 to 11.0 depending upon the acidity of the quebracho powder used. 160 grams of hydrochloric acid 20° Bé. were added to bring the pH between 8 and 9 and under stirring 160 grams aluminum chloride crystals, previously dissolved in sufficient water, were poured in. A precipitate formed which may be filtered off if desired. The filtered solution or suspension may be evaporated down to a powder which can be afterwards redissolved for use or may be diluted with water to a total weight of 4000 grams of solution having a pH of 2.5 to 3.5 for immediate use.

(b) 400 grams of the condensation product of naphthalene sulfonic acid and formaldehyde, prepared in accordance with the disclosure of U. S. P. 1,336,759 was dissolved in 2000 cc. water. To this there were added 160 grams of aluminum chloride crystals previously dissolved in a sufficient amount of water. The small amount of precipitate that formed may be filtered off if desired. The mixture is diluted with water to a total weight of 4000 grams. Upon further dilution with water, a perceptible turbidity occurred but such apparently does not interfere with the penetrating and disintegrating characteristics of the solution. As in (a) the liquid may be dried down to a powder and redissolved in water when needed.

(c) 400 grams quebracho extract powder was mixed intimately with 160 aluminum chloride crystals thereby yielding a surface active agent which was ready for use by simply suspending it in a suitable amount of water.

(d) 400 grams of either the disodium salt or the free acid of the dry condensation product of naphthalene sulfonic acid and formaldehyde were intimately mixed with 160 grams aluminum chloride crystals. The composition may be simply suspended or dissolved in a suitable amount of water to obtain the desired penetrating and disintegrating action.

*Example 2*

100 grams of a powdered channel type carbon black, such as Binney & Smith's Micronex W-6 was gradually added to a suitable vessel equipped with a "lightning" type agitator containing 50 cc. of the solution of Example 1(a) and 760 grams of water. Mixing was continued for about 30 minutes. The carbon black was quickly wetted and readily disintegrated to give a black suspension in which the particles were uniformly finely subdivided and uniformly distributed and suspended throughout the liquid. The pH of the suspension was about 3.5 to 4.0. This suspension contained 11% carbon black content. A spot test of this suspension on filter paper showed a sharp line of demarkation between the carbon black particles and the colorless liquid of the suspension. If a dispersing agent which had not been treated in accordance with the present invention, had been used the dispersed paste would have shown no clear line of demarkation upon making a spot test; in fact, a virtually dispersed colloidal "solution" would have resulted exhibiting a colored filtrate upon filtration. A further attribute of the carbon black suspension prepared with the solution of Example 1(a) is that no appreciable settling occurred upon standing, except perhaps to a slight extent at the very top where some supernatant liquid was found. At the bottom, however, no sediment appeared. If a straight dispersing agent had been employed, the resulting 11% colloidal dispersion would upon standing settle badly, forming a hard caked sediment. Additionally upon diluting the 11% suspension to a 1% pigment concentration using a one-half percent solution of the dry preparation described in Example 1(c), no Brownian motion was observed under a microscope and the particles were observed to be of an extremely uniform fine subdivision as shown in the photomicrograph, Figure 2. The photomicrograph also showed an even distribution of multitudinous number of fine carbon particles across the entire microscopic field. These particles appear transparent and almost shred-like. For comparison purposes, 100 grams of the same carbon black powder was continuously ground for six days and six nights in a laboratory pebble mill with 810 grams water and the resultant paste was diluted to a 1% pigment concentration. A photomicrograph, Figure 1, of the 1% pigment concentration which is the same concentration of carbon black as the suspension of Figure 2, showed relatively fewer finely subdivided particles and the presence of many large hard denser, more opaque, agglomerated aggregates.

Example 3

The same procedure was followed as in Example 2 except 80 grams of the solution of the surface active agent prepared in Example 1(b) and 730 cc. of water were agitated with the carbon black. A suspension of carbon black similar in properties to that obtained in Example 2 was thereby thus secured. A spot test on filter paper produced a sharply defined line of demarkation between the carbon black particles and the liquid of the suspension. A photomicrograph of 1% dilution prepared analogously to that of Example 2 gave a similar photomicrograph.

Example 4

1000 grams of a channel type carbon black, such as Binney & Smith's Micronex W-6 was placed in a suitable container and mixed slowly with 875 cc. of an aqueous solution prepared by mixing 400 cc. of Example 1(a) with 475 cc. of water. After kneading for some time pellets gradually were formed and were dried in an oven at 180° F. for 24 hours. The resultant pellets were readily incorporated in water to give directly a desirable type of suspension and may be also readily incorporated into oil. For instance, if 100 grams of the pellets were stirred into 810 grams of water using the equipment and conditions of Example 2, an 11% suspension was formed similar in all respects to the suspension obtained and described in Example 2. The pellets show approximately one-half the apparent density of the carbon black powder from which they were made. They are substantially non-dusting and offer a compact form of carbon black which can be quickly incorporated into aqueous systems to produce directly a suspension of uniformly extremely finely subdivided carbon black particles which are uniformly distributed and suspended throughout the liquid phase.

Example 5

The same procedure was followed as in Example 4 except 450 cc. of the solution of surface active agent prepared in Example 1(b) and 425 cc. of water were used. A pellet was formed which when dried easily disintegrated and suspended in water upon agitation to yield directly a suspension very similar to that shown in Example 4.

Example 6

100 grams of the carbon black pellets prepared by either the procedure described in Example 4 or 5 were vigorously stirred into 810 cc. of water with a "lightning" type high speed stirrer. The pellets disintegrated to form a smooth creamy suspension which had a pH of about 3.5 to 4.0. The suspension was neutralized with a suitable alkali solution such as sodium carbonate, until a pH of about 6.0 to 7.5 was reached. At this point, if desired, one may incorporate from 5% to 20% of a suitable plasticizing agent, such as rosin or Bardol in which case the finely subdivided carbon black serves to act as an excellent emulsifying agent, but the plasticizing agent or softener may, if desired, be previously emulsified by adding a small quantity of sodium oleate. The mixture was intimately mixed with synthetic rubber latex and the grayish black composite mixture was treated with a coagulating agent, such as the usual combination of brine and sulphuric acid. The black precipitated rubber crumb was filtered, washed thoroughly, and pressed and/or dried to any moisture content, such as 5% or lower but not completely dried. Alternatively if Bardol or similar softener, such as a rosin derivative is present, the crumb may be completely desiccated. Because of the remarkable degree of subdivision and the uniformity of the carbon black particles in the suspension used and the resultant uniform distribution of the carbon black within the coagulated rubber, a good smooth homogeneous dispersion of the carbon black in the rubber was readily and quickly obtained when the pigmented rubber particles were masticated on the milling rolls and with less expenditure of mechanical energy than by the conventional dry compounding procedure. Furthermore, the physical characteristics of the synthetic rubber sheet resulting from the milling operation or products made therefrom were considerably improved.

For the preparation of the surface active agents of this invention I may start with any dispersing agent capable of having its colloidal dispersing power destroyed by the action of a flocculating agent. Thus there may be employed condensation products of naphthalene sulfonic acid and formaldehyde, commercially known under the names Darvan, Daxad, Ramol, Syntan; or lignin-sulfonic acids or salts, commercially known under the names Hornkem #1, Marathon Agent 340-2; but I prefer to use the glucoside extracts, especially glucosides of the tannin type such as quebracho which glucoside extracts are known commercially under the names Bark Extract, Hornkem #12, Purex SMS, Tannin Extract, etc. These are available in either water soluble powders or concentrated solutions or extracts and are secured by solubilizing the tannin glucosides, such as ordinary quebracho bark by treatment with bisulfite of soda, digesting same, and clarifying. As flocculating agents I prefer to use aluminum salts such as aluminum chloride, aluminum sulphate, aluminum acetate, but a great variety of other agents may also be utilized to destroy the colloidal dispersing power of the dispersing agents, thus ferric chloride, copper sulphate, zinc chloride, chrome alum, barium chloride, calcium chloride, thorium nitrate, chromium fluoride, titanium dioxide, manganese chloride are useful in this respect. Still other compounds adaptable to the purpose are basic or triphenyl methane dyes, such as methyl violet, Victoria blue, methylene blue, and the soluble aromatic primary amine salts, such as aniline hydrochloride, toluidine hydrochloride, benzidene hydrochloride. The specificity of each flocculating agent for a given dispersing agent in destroying the colloidal dispersing power may be quickly and readily determined by the following tests: First determine for any given pigment the least amount of dispersing agent required to produce a good colloidal dispersion using minimum water amounts, then dilute this to approximately 10% pigment content. At this point a dispersed "solution" will be evident. Then to this added, under agitation, a solution of the flocculating agent to be tested. When the flocculation point is reached, thickening or increase in viscosity occurs but the mixture is still stirrable. A spot test on filter paper will indicate complete flocculation by exhibiting a sharp mark of demarkation between the flocculated particles and the clear liquid of the suspension. Thus the requisite amount of flocculating agent needed is then compounded with the dispersing agent to produce the new surface active agents of this invention. It is often preferable to use an excess of these flocculating agents.

The amount of the new agent to be employed with any pigment will vary depending upon the particular new agent and the kind and type of pigment being treated. Usually the best amount is the least dispersing agent required to produce a good colloidal dispersion plus the amount of flocculating agent required in the particular case to destroy the colloidal dispersing power of the dispersing agent. For instance, if it has been predetermined that four parts of this dispersing agent represents the least amount to thoroughly and colloidally disperse 100 parts of carbon black and it has also been determined that a solution of two parts of aluminum chloride crystals is a slight excess over that required for complete flocculation, then six parts of the compounded surface active agent is a good amount to use in the case of this particular carbon black. When more of the compounded surface active suspending agent is used, say twice as much, or even up to equal parts of pigment or more, no particular harm is caused, if the excess can be tolerated in the particular aqueous end use, and the excess will serve to accentuate easier incorporation and disintegration of the pigment in water. In the case of incorporation into synthetic rubber latex, for instance, in the case of carbon black such as Micronex W-6, 2% to 8% would be a preferred range.

The concentration of pigment in preparing the suspensions of the invention depends upon the consistency desired. For instance, if a pumpable sludge is desired, then it is better to work at lower concentrations such as 10% to 12% in the case of Micronex W-6 but this will vary with the particular carbon black. On the other hand, if the mixture is to be used in emulsion paints, it is obvious that much higher concentrations may be desirable. The type of equipment in which the suspension is prepared is also a factor permitting greater or lesser concentrations. For instance, in the case of the particular carbon black specified, if it is desired to use simple mixing apparatus, such as high speed or "lightning" agitators, a range of 11% to 14% carbon black content operates very satisfactorily. On the other hand, if one wishes to use Werner-Pfleiderer or dough mixing apparatus one may employ a pigment concentration to about 30%. But with other pigments and other carbon blacks this may be rare.

The pigment suspensions prepared with the compounded agents of this invention may be further differentiated from suspensions prepared with plain water or compounds that act no better than water, such as soaps, salts, acids, solvents, emulsifying agents, foaming or anti-foaming agents, by diluting the resultant suspensions to a low pigment concentration permitting microscopic observation with a solution such as one consisting of 4% sodium chloride and 1% sulfuric acid.

In the case of reinforcing rubber with carbon black, I prefer to use a channel gas black type. However, other varieties of carbon black, such as gas black, impingement black, thermal decomposition carbons, furnace blacks, and acetylene carbon black can be used with advantage. It will be obvious, of course, that the type of carbon black selected will influence the amount of surface active agent of the invention required and the amount of water required to produce an aqueous suspension of the desired type.

The teachings of the invention obviously may be practiced with advantage for the preparation of water-in-oil textil printing pastes or oil-in-water emulsion type paints, using prime pigments and/or extenders. Among these may be mentioned—zinc oxide, titanium dioxide, lithopone, whitings, clays, blanc fixe, hydrated alumina, finely divided calcium carbonates, iron oxides, ochres, ultramarine blue, cadmium reds, cadmium yellows, benzidene yellows, Hansa yellows, phthalocyanines, indanthrene vat pigment dyes, toluidine reds, lithol reds, and the many other pigments described and listed in Chapter I entitled "Classification of pigments" of volume II of Dr. J. J. Mattiello's book "Protective and Decorative Coatings," published in 1943 by John Wiley & Sons. In all such cases the surface active agents of the invention insure the production of suspensions of uniformly finely divided pigment particles which are uniformly distributed and suspended throughout the media.

While I have described my invention in the case of synthetic rubber in terms of a GR-S synthetic latex, still obviously the invention may be applied advantageously to other latices of sulfur vulcanizable synthetic copolymers of conjugated dienes such as butadiene, with one or more unsaturated resin-forming materials, such as vinylchloride, modified styrenes, acrylonitrile, acrylates, vinyl pyridine, etc. The degree of polymerization of the synthetic latex is not vital since the invention can be applied to highly cross-linked polymerized material which is not readily compounded by conventional milling or that requires such extensive milling that the physical properties are destroyed.

By the process of the present invention a pigment is obtained which has the unique feature of being quickly and readily wet by water and by oil systems. The procedure permits the direct preparation of an aqueous suspension in which the pigment is thoroughly subdivided uniformly and distributed evenly, thereby facilitating direct incorporation into an aqueous system, such as a rubber latex. The surface active agents of the invention permit the preparation of colored non-dusting pigment pellets which readily disintegrate in an aqueous system to a finely subdivided suspension of pigment particles which are substantially free from aggregates.

I claim:

1. An oil wetting, water wetting carbon black composition comprising a carbon black and a surface active agent consisting essentially of a dispersing agent selected from the group consisting of a condensation product of a naphthalene sulfonic acid compound with formaldehyde, lignin-sulfonic acid compounds and glucoside extracts of tannins and an amount of an acid salt flocculating agent at least sufficient to destroy the colloidal dispersing power of the dispersing agent.

2. A surface active agent composition consisting essentially of a condensation product of a naphthalene sulfonic acid compound with formaldehyde dispersing agent and an acid salt flocculating agent in an amount at least sufficient to destroy the colloidal dispersing power of said condensation product said amount being such that when sufficient flocculating agent is mixed with the dispersing agent and with pigment and water and the mixture spot tested on filter paper, a sharp line of demarkation between the pigment and the clear liquid is produced; said surface active agent having the effect, when mixed with an aqueous suspension of organic or carbon black pigment, of producing a finely divided, uniform suspension of pigment particles.

3. A surface active agent consisting essentially of a condensation product of a naphthalene sulfonic acid compound with formaldehyde and an aluminum acid salt flocculating agent in an amount at least sufficient to destroy the colloidal dispersing power of said condensation product said amount being such that when sufficient flocculating agent is mixed with the dispersing agent and with pigment and water and the mixture spot tested on filter paper, a sharp line of demarkation between the pigment and the clear liquid is produced; said surface active agent having the effect, when mixed with an aqueous suspension of organic or carbon black pigment, of producing a finely divided, uniform suspension of pigment particles.

4. An oil wetting, water wetting carbon black pellet comprising a carbon black and a surface active agent consisting essentially of a dispersing agent selected from the group consisting of a condensation product of a naphthalene sulfonic acid compound and formaldehyde, lignin-sulfonic acid compounds and glucoside extracts of tannins and an amount of an acid salt flocculating agent at least sufficient to destroy the colloidal dispersing power of said dispersing agent, said composition being in the form of a substantially non-dusting pellet.

5. A suspension of uniformly finely subdivided carbon black particles comprising an aqueous medium, carbon black and a surface active agent consisting essentially of a dispersing agent selected from the group consisting of a condensation product of a naphthalene sulfonic acid compound with formaldehyde, lignin-sulphonic acid compounds and glucoside extracts of tannins and an amount of an acid salt flocculating agent at least sufficient to destroy the dispersing power of the dispersing agent.

6. An oil wetting, water wetting organic pigment composition comprising an organic pigment and a surface active agent consisting essentially of a dispersing agent selected from the group consisting of a condensation product of a naphthalene sulfonic acid compound with formaldehyde, lignin-sulphonic acid compounds and glucoside extracts of tannins; and an amount of an acid salt flocculating agent at least sufficient to destroy the colloidal dispersing power of the dispersing agent.

7. An oil wetting, water wetting organic pigment composition comprising an organic pigment and a surface active agent consisting essentially of a condensation product of a naphthalene sulfonic acid compound with formaldehyde and an amount of an acid salt flocculating agent at least sufficient to destroy the colloidal dispersing power of said condensation product.

8. An oil wetting, water wetting carbon black composition comprising a carbon black and a surface active agent consisting essentially of a condensation product of a naphthalene sulfonic acid compound with formaldehyde and an amount of an acid salt flocculating agent at least sufficient to destroy the colloidal dispersing power of said condensation product.

9. An oil wetting, water wetting organic pigment composition comprising an organic pigment and a surface active agent consisting essentially of an extract of quebracho and an amount of an acid salt flocculating agent at least sufficient to destroy the colloidal dispersing power of said quebracho extract.

10. An oil wetting, water wetting carbon black composition comprising a carbon black and a surface active agent consisting essentially of an extract of quebracho and an amount of an acid salt flocculating agent at least sufficient to destroy the colloidal dispersing power of said quebracho extract.

11. A surface active agent consisting essentially of a dispersing agent selected from the group consisting of a condensation product of a naphthalene sulfonic acid compound with formaldehyde, lignin-sulfonic acid compounds and glucoside extracts of tannins; and an amount of an acid salt flocculating agent at least sufficient to destroy the colloidal dispersing power of said dispersing agent said amount being such that when sufficient flocculating agent is mixed with the dispersing agent and with pigment and water and the mixture spot tested on filter paper, a sharp line of demarkation between the pigment and the clear liquid is produced; said surface active agent having the effect, when mixed with an aqueous suspension of organic or carbon black pigment, of producing a finely divided, uniform suspension of pigment particles.

12. A surface active agent consisting essentially of an extract of quebracho dispersing agent and an amount of an acid salt flocculating agent at least sufficient to destroy the colloidal dispersing power of said quebracho extract said amount being such that when sufficient flocculating agent is mixed with the dispersing agent and with pigment and water and the mixture spot tested on filter paper, a sharp line of demarkation between the pigment and the clear liquid is produced; said surface active agent having the effect, when mixed with an aqueous suspension of organic or carbon black pigment, of producing a finely divided, uniform suspension of pigment particles.

13. An oil wetting, water wetting pigment composition comprising a pigment of the group consisting of carbon black and organic pigments and a surface active agent consisting essentially of a condensation product of a naphthalene sulfonic acid compound with formaldehyde and an amount of an acid salt flocculating agent at least sufficient to destroy the colloidal dispersing power of the condensation product.

14. A process for producing uniformly pigmented rubber containing finely divided pigment particles and having a high tensile strength, comprising, mixing a pigment with water, producing a substantially non-settling, finely divided and uniform suspension of pigment particles free of Brownian movement by adding to said pigment in water a surface active agent consisting essentially of a dispersing agent having colloidal dispersing power, the latter being selected from the group consisting of a condensation product of a naphthalene sulfonic acid compound with formaldehyde, a lignin-sulfonic acid compound and a glucoside extract of tannin; together with an amount of an acid salt flocculating agent sufficient to substantially destroy the colloidal dispersing power of the dispersing agent, said amount being such that when sufficient flocculating agent is mixed with the dispersing agent and with pigment and water and the mixture spot tested on filter paper, a sharp line of demarkation between the pigment and the clear liquid is produced; mixing said suspension with a rubber latex, coagulating the mixture with a coagulating agent and isolating the resulting uniformly pigmented rubber product.

15. A process for producing uniformly pigmented rubber containing finely divided pigment particles and having a high tensile strength, comprising, mixing a pigment with water, producing a substantially non-settling, finely divided and uniform distributed suspension of pigment particles free of Brownian movement by adding to said pigment in water a surface active agent consisting essentially of a condensation product of a naphthalene sulfonic acid compound with formaldehyde dispersing agent having colloidal dispersing power; together with an amount of an acid salt flocculating agent sufficient to substantially destroy the colloidal dispersing power of the dispersing agent, said amount being such that when sufficient flocculating agent is mixed with the dispersing agent and with pigment and water and the mixture spot tested on filter paper, a sharp line of demarkation between the pigment and the clear liquid is produced; mixing said suspension with a rubber latex, coagulating the mixture with a coagulating agent and isolating the resulting uniformly pigmented rubber product.

16. A process for producing uniformly pigmented rubber containing finely divided pigment particles and having a high tensile strength, comprising, mixing a pigment with water, producing a substantially non-settling, finely divided and uniform distributed suspension of pigment particles free of Brownian movement by adding to said pigment in water a surface active agent consisting essentially of a glucoside extract of tannin dispersing agent having colloidal dispersing power; together with an amount of an acid salt flocculating agent sufficient to substantially destroy the colloidal dispersing power of the dispersing agent, said amount being such that when sufficient flocculating agent is mixed with the dispersing agent and with pigment and water and the mixture spot tested on filter paper, a sharp line of demarkation between the pigment and the clear liquid is produced; mixing said suspension with a rubber latex, coagulating the mixture with a coagulating agent and isolating the resulting uniformly pigmented rubber product.

17. A process for producing uniformly pigmented rubber containing finely divided pigment particles and having a high tensile strength, comprising, mixing carbon black with water, producing a substantially non-settling, finely divided and uniform distributed suspension of pigment particles free of Brownian movement by adding to said pigment in water a surface active agent consisting essentially of a dispersing agent having colloidal dispersing power, the latter being selected from the group consisting of a condensation product of a naphthalene sulfonic acid compound with formaldehyde, a lignin-sulfonic acid compound and a glucoside extract of tannin; together with an amount of an acid salt flocculating agent sufficient to substantially destroy the colloidal dispersing power of the dispersing agent, said amount being such that when sufficient flocculating agent is mixed with the dispersing agent and with pigment and water and the mixture spot tested on filter paper, a sharp line of demarkation between the pigment and the clear liquid is produced; mixing said suspension with a rubber latex, coagulating the mixture with a coagulating agent and isolating the resulting uniformly pigmented rubber product.

18. A process for producing uniformly pigmented rubber containing finely divided pigment particles and having a high tensile strength, comprising, mixing an organic pigment with water, producing a substantially non-settling, finely divided and uniform distributed suspension of pigment particles free of Brownian movement by adding to said pigment in water a surface active agent consisting essentially of a dispersing agent having colloidal dispersing power, the latter being selected from the group consisting of a condensation product of a naphthalene sulfonic acid compound with formaldehyde, a lignin-sulfonic acid compound and a glucoside extract of tannin; together with an amount of an acid salt flocculating agent sufficient to substantially destroy the colloidal dispersing power of the dispersing agent, said amount being such that when sufficient flocculating agent is mixed with the dispersing agent and with pigment and water and the mixture spot tested on filter paper, a sharp line of demarkation between the pigment and the clear liquid is produced; mixing said suspension with a rubber latex, coagulating the mixture with a coagulating agent and isolating the resulting uniformly pigmented rubber product.

19. A non-cracking pigmented rubbery product having a high tensile strength and containing finely subdivided and uniformly distributed pigment particles, as produced by the process of claim 14.

VINCENT C. VESCE.

REFERENCES CITED

The following references are of record in the file of this patent:

UNITED STATES PATENTS

| Number | Name | Date |
| --- | --- | --- |
| 1,301,693 | Hartong | Apr. 22, 1919 |
| 1,610,226 | Cohen | Dec. 14, 1926 |
| 1,623,517 | Acheson | Apr. 5, 1927 |
| 1,836,588 | Gunther | Dec. 15, 1931 |
| 2,046,758 | Tucker | July 7, 1936 |
| 2,079,548 | Crossley | May 4, 1937 |
| 1,843,420 | Gunther | Feb. 2, 1932 |
| 2,304,308 | Hurd | Dec. 8, 1942 |
| 2,296,066 | Sloan | Sept. 15, 1942 |
| 2,212,629 | Alessandroni | Aug. 27, 1940 |

Certificate of Correction

Patent No. 2,432,461.  December 9, 1947.

VINCENT C. VESCE

It is hereby certified that errors appear in the printed specification of the above numbered patent requiring correction as follows: Column 4, line 1, for "200 cc." read *2000 cc.*; column 11, line 35, claim 15; line 59, claim 16; column 12, line 6, claim 17; line 32, claim 18; strike out the word "distributed" in each occurrence; line 53, claim 19, for "non-cracking" read *non-crocking*; and that the said Letters Patent should be read with these corrections therein that the same may conform to the record of the case in the Patent Office.

Signed and sealed this 16th day of March, A. D. 1948.

[SEAL]

THOMAS F. MURPHY,
*Assistant Commissioner of Patents.*